United States Patent [19]

Kim et al.

[11] Patent Number: 5,001,809
[45] Date of Patent: Mar. 26, 1991

[54] DOOR APPARATUS WITH DAMPER SWITCH

[75] Inventors: Kyu C. Kim; Jong D. Lim, both of Suwon, D.P.R. of Korea

[73] Assignee: SamSung Electronics Co., Ltd., Suwon, D.P.R. of Korea

[21] Appl. No.: 400,875

[22] Filed: Aug. 30, 1989

[30] Foreign Application Priority Data

Dec. 31, 1988 [KP] D.P.R. of Korea ............... 88-18239

[51] Int. Cl.$^5$ ............................................. F16D 57/00
[52] U.S. Cl. ..................................... 16/62; 16/DIG. 9
[58] Field of Search ............... 16/51, 62, 82, DIG. 10, 16/DIG. 9

[56] References Cited

U.S. PATENT DOCUMENTS 4,576,252 3/1986 Omata ............................. 16/DIG. 9
4,638,528 1/1987 Omata ............................. 16/DIG. 9

Primary Examiner—Richard K. Seidel
Assistant Examiner—Carmine Cuda
Attorney, Agent, or Firm—Robert E. Bushnell

[57] ABSTRACT

A door apparatus with damper switch formed by
a control function which supplies a soft operation of a door with combination of a spring tension and a friction of viscous oil in a damper switch,
a guide function which supplies a rotation route from the operation of the door and a switching function by protrusion respectively thereinto, and
a transferring moving pin which moves along the rotation route, whereby the door apparatus can be assembled easily by fixing the damper switch only and operated smoothly by tension and friction.

17 Claims, 4 Drawing Sheets

DOOR APPARATUS WITH DAMPER SWITCH

BACKGROUND OF THE INVENTION (1) Field of the invention

The present invention relates to a door opening and shutting apparatus. More particularly, it relates to a door apparatus which has a damper switch composed of main body and the first gear, the apparatus being especially designed to provide easy assembling.

The damper includes a control means, guide means, transferring means and fixing means.

The apparatus also allows for the door to be easily operated by a push of the door.

(2) Related Art

Most conventional door opening and shutting apparatus, which are used for protection of a function switch, are mainly composed of a spring biased door hinge, a geared damper and a switch.

During assembly, a spring is biased between the door hinge and the front assure safe door opening and then, a geared damper is attached to a side wall of the front panel.

And also, the switch is fixed between the front panel and the door.

There is a need for permitting the attachment of a special switch, but it is impertinent for a soft opening and shutting.

And also, it is hard to assemble the switch, the spring biased door hinge and the geared damper respectively for the soft opening.

SUMMARY OF THE INVENTION

The object of the present invention is to provide that a door of electronic machinery can be operated smoothly.

The current inventions includes a damper switch having control means, guide means, transferring means and fixing means.

A door switch is formed in the damper switch and so there is no need for other switching means.

In assembling, the damper switch is fixed to the front panel and then, the second gear with door is hinged.

Consequently, embodiments of the correctly disclosed inventions enable easy assembling and so it can be operated smoothly.

BRIEF DESCRIPTION OF THE DRAWINGS

The foregoing and other objects, features and advantages of the currently disclosed inventions should become apparent from the following description taken in conjunction with the accompanying drawings, in which.

DETAILED DESCRIPTION OF THE PREFERRED EMBODIMENT

Figure 1:
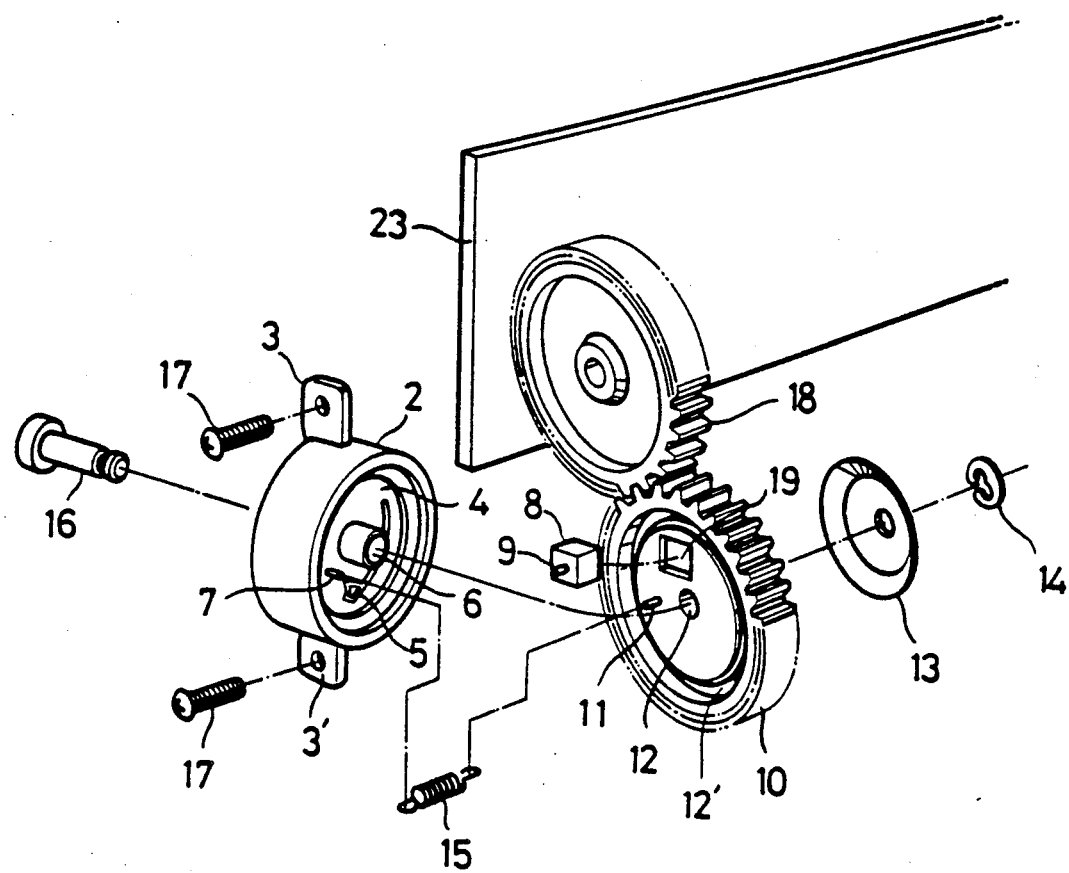
FIG. 1 is an exploded view of the damper switch of the present invention.
Figure 2:
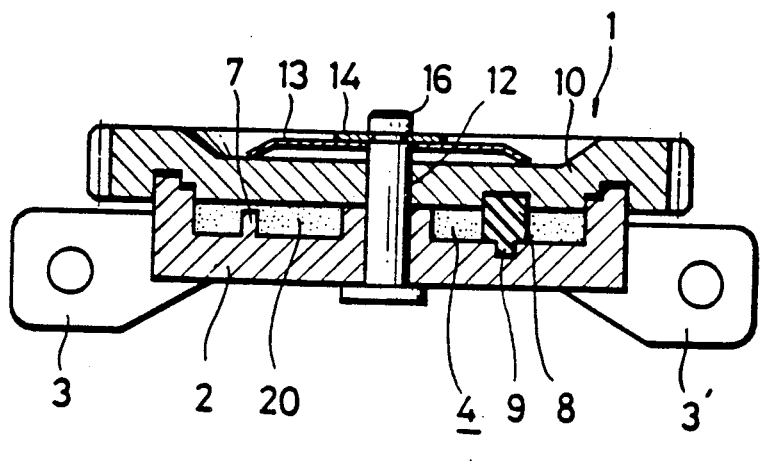
FIG. 2 is a cross-sectional view of the damper switch of the present invention.

Referring first to FIGS. 1 and 2, a damper switch of the present invention is shown.

The damper switch 1 comprises mainly main body 2 with fixing parts 3,3' as a fixing means on the upper and lower parts thereof and the first gear 10.

An operating part 4 of the main body 2 includes a switching groove 5, a hanging pin 7 and a connecting orifice 6 which are formed respectively at the inner space of the main body 2.

One side of the first gear 10 comprises a moving pin holder 8 inclusive of a moving pin 9 as a transferring means, a hanging pin 11 for connecting the hanging pin 7 by means of a spring 15, a connecting hole 12 for connecting the main body 2 by inserting a connecting pin 16 through the connecting orifice 6 and a circular groove 12' as an arc type for inserting one side edge of the main body 2.

It is possible to change construction of the operating part with one side of the first gear 10.

The moving pin holder 8 is attached in a fixing groove 19 corresponding to the switching grooves 5 of the operating part 4.

The damper switch 1 is full of damping oil 20 between the main body 2 and the first gear 10 and so the damping oil and the spring 15 operates as a control.

The second gear 18 is connected to the first gear 10 by tooth coupling and also, gear 18 is attached at the door 23.

Second gear 18 is rotated by a hinge shaft 24 and the hinge shaft 24 is fixed rotatively at a side wall of a space part 22.

The space part 22 is formed at any part of a front panel 21 for fixing the damper switch 1 and the second gear 18.

The fixing parts 3,3' of the main body 2 are fixed to the bosses 25,25' respectively by means of screws 17.

Connecting pin 16 is fastened by a spring washer 13 and a snap ring 14.

Figure 3A:
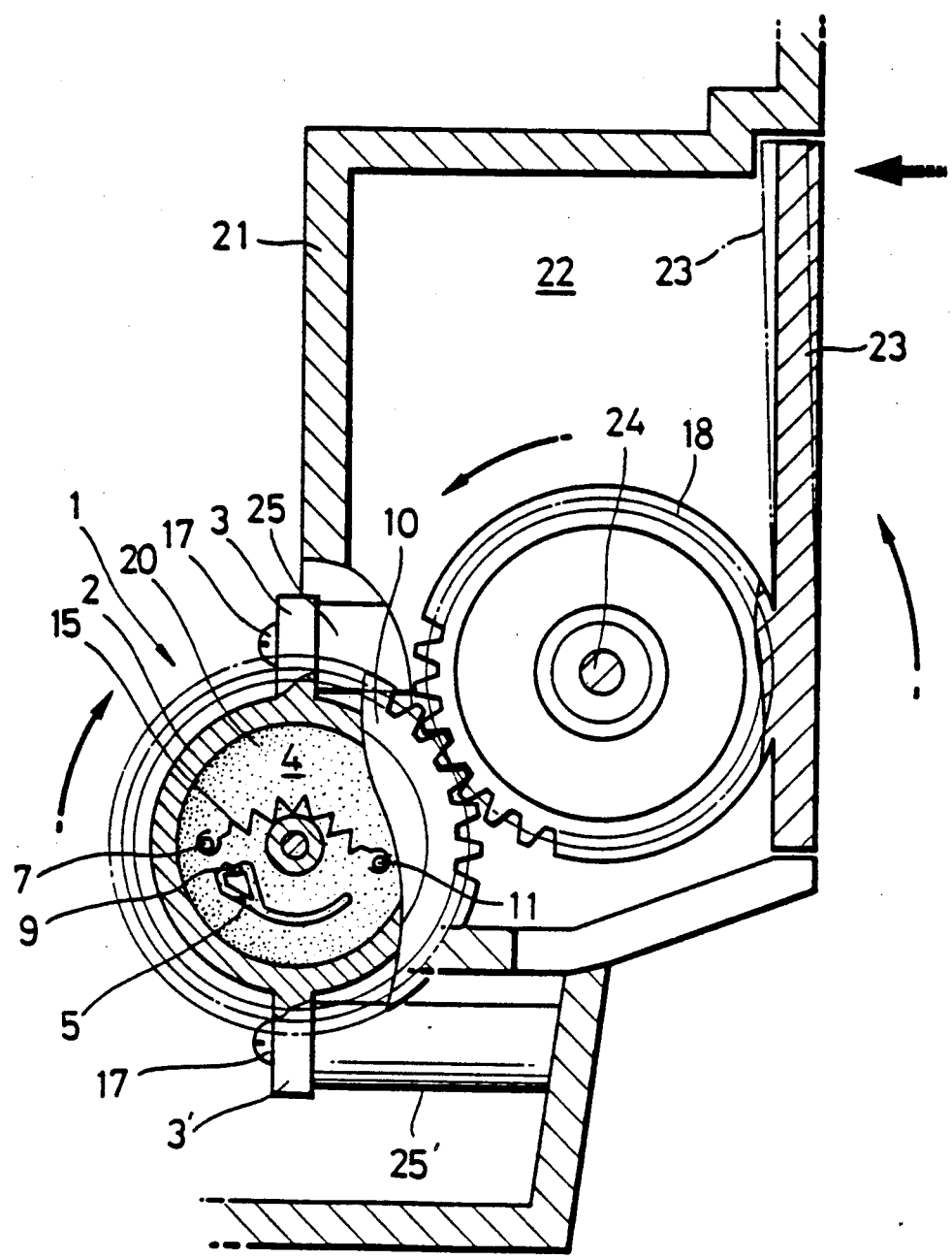
FIG. 3A is a side-sectional view of the present invention as an assembled state at the front panel and the door when the door is in a shut state.
Figure 3B:
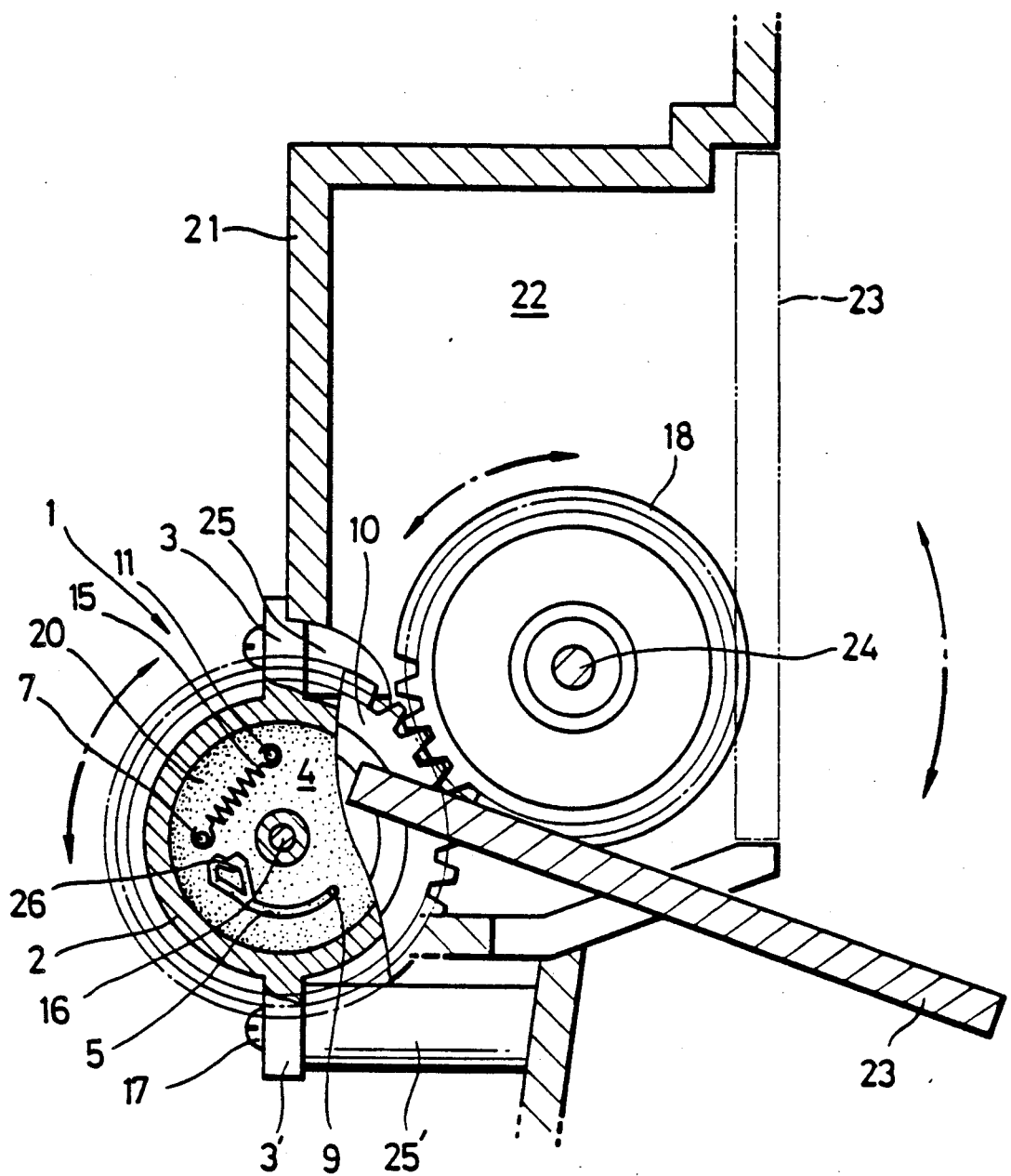
FIG. 3B is a side-sectional view of the present invention as an assembled state panel and the door when the door is in an open state.
Figure 4:
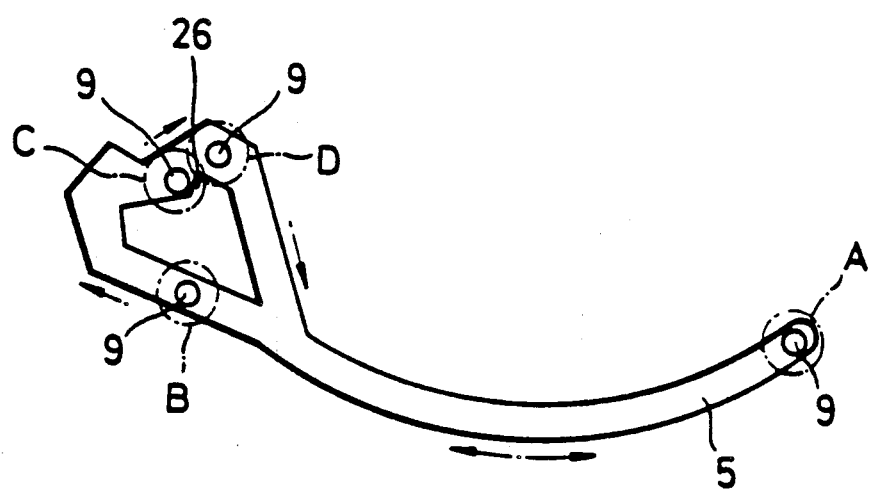
FIG. 4 is an illustration showing the operation of the switching groove.

Referring to FIGS. 3A, 3B and 4, one end of the switching groove 5 as a guide means is formed as a triangle type and the other end is formed as an arc type.

A projection 26 is formed on the left side of the triangle for switching the moving pin 9.

In assembling, the damper switch 1 is fixed on a front panel 21 by fixing the screws 17 to the boss 25,25' through the fixing parts 3,3' respectively.

Then, the second gear 18 inclusive of the door 23 is connected to the first gear 10 by tooth coupling and also, the hinge shaft 24 inclusive of the second gear 18 is to be fixed at a side wall of the space part 22.

In operating, FIG. 3A represents the shut state of the door 23.

The moving pin 9 is located at the projection 26 of the switching groove 5 as a "C" position in FIG. 4.

If a user wants to open the door 23, the user pushes the door in the direction of an upper arrow.

Then the door 23 is pushed into the space part 22 as a two dot chain lined door 23.

As the door 23 is attached at the second gear 18, the second gear 18 rotates counter clockwise centering around the hinge shaft 24 and the first gear 10 rotates clockwise according to the gear 18.

Then, the moving pin 9 of the moving pin holder 8 passes the projection 26 as a "D" position of FIG. 4.

As the moving pin 9 passes the projection 26, the first gear 10 inclusive of the moving pin 9 rotates counter clockwise by the spring means and so the second gear 18 rotates clockwise by the weight of the door 23.

At that time, the door 23 is opened gradually by the weight of the door 23 with the aid of spring 15 and the door 23 stops at on "A" position of FIG. 4.

The damping oil 20 supplies a friction force to the first gear 10 and so it prevents the door from sudden opening.

FIG. 3B represents the opened state of the door 23.

If a user wants to shut the door, the user pushes the door upwards.

Then, the second gear 18 rotates counter clockwise with the door 23 and the first gear 10 rotates clockwise gradually.

Accordingly, the moving pin 9 of the first gear moves along the switching groove 5 from the "A" position to the "c" position through the "B" position.

As mentioned above, the current invention supplies the soft door opening and shutting apparatus by means of the damper switch inclusive of a control means such as the spring and the damping oil.

And also, the current invention does not need another switch means, it is because that the switching function is formed in the damper switch as a switching groove.

Accordingly, the current invention enables easy assembly easily, because the damper switch is fixed to the front panel and the second gear is only coupled to the first gear of the damper switch.

While preferred embodiments have been set forth, various modifications, alterations, and changes may be made without departing from the spirit and scope of the currently disclosed inventions as defined in the appended claims.

What is claimed is:

1. A door apparatus, comprising:
 a main body having a central axis, a switching groove, and means for attaching the main body to a panel;
 said main body providing an interior cavity means for containing a viscous liquid;
 a first gear having a slot;
 means for attaching said first gear to said main body with said first gear disposed to rotate around said central axis relative to said main body, with said first gear engaging said main body and enclosing said cavity means, and with said slot being positioned on one side of said first gear facing said switching groove;
 a second gear connectable to a door with said second gear rotatingly engaging said first gear as the first and second panels are moved relative to one another;
 a straight moving pin;
 means disposed with said slot between said first gear and main body, for holding said moving pin with said moving pin positioned within said switching groove and coupling said first gear and main body; and
 means connected to said main body and first gear, for biasing said first gear to urge said moving pin toward one position.

2. The door apparatus of claim 1, further comprised of said second gear being positionable to rotate around a shaft of a hinge of the door.

3. The door apparatus of claim 1, wherein said switching groove is comprised of:
 an arcuate section having first and second terminals open to conduct said moving pin through an arc extending between said first and second terminals; and
 a continuous section having a fork with first and second branches extending from said second terminal, and open to conduct said moving pin from said first branch of said fork, along a plurality of lengths, and to said second branch of said fork.

4. The door apparatus of claim 3, wherein said plurality of lengths comprise:
 a first of said lengths extending transversely from said fork along a first straight path substantially parallel to said second branch;
 a second of said lengths extending from said first of said lengths; and
 a third of said lengths extending between said second of said lengths and said second branch along a second straight path substantially parallel to said first branch;
 sides of said second and third of said lengths most proximal to said central axis forming means for limiting arcuate travel of said moving pin and for engaging said moving pin when said first and second hanging pins cause said bias means to exhibit a greatest force as said moving pin travels along said switching groove between said second and third of said lengths.

5. The door apparatus of claim 3, wherein said:
first branch of said fork extends along a first straight path continuing from said second terminal along an first axis traverse to and on one side to a tangent of said first arc at said second terminal, obliquely away from said central axis; and
second branch of said fork extends along a second straight path continuing from said second terminal along a second axis traverse to said tangent and said first branch and on a second and opposite side of said tangent from said first side; and
a first of said lengths extends traversely from said first branch along a third straight path substantially parallel to said second branch;
a second of said lengths extends from said first of said lengths; and a third of said lengths extends between said second of said lengths and said second branch along a fourth straight path substantially parallel to said first branch;
sides of said second and third of said lengths most proximal to said central axis forming means for limiting arcuate travel of said moving pin and for engaging said moving pin when said first and second hanging pins cause said bias means to exhibit a greatest force as said moving pin travels along said switching groove between said second and third of said lengths.

6. A door apparatus, comprising:
 a main body having a centrally positioned orifice oriented along a direction of a central axis, a switching groove defining an arc less than a circumference around said central axis, a first hanging pin for an operating part, and means for attaching the main body to a penal;
 said main body providing an interior cavity means for containing a viscous liquid;
 a first gear having a first plurality of teeth disposed around a first periphery and a connecting aperture, a slot and a second hanging pin;

means extending through said orifice and aperture, for attaching said first gear to said main body with said first gear disposed rotatably around said central axis relative to said main body and with said slot and second hanging pin being positioned on one side of said first gear facing said first hanging pin;

a second gear having a second plurality of teeth disposed around a second periphery, and connectable to a door with said second plurality of teeth meshing with said first plurality of teeth as the door is moved relative to the pane;

a moving pin;

means disposed within said slot and between said main body and said first gear, for holding said moving pin with said moving pin positioned between said main body and said first gear to travel within said switching groove; and means connected to said first and second hanging pins, for biasing said first gear with said moving pin toward one position relative to said switching groove of said main body.

7. The door apparatus of claim 6, further comprised of said said second gear being positionable to rotate around a shaft of a hinge of the door.

8. The door apparatus of claim 6, wherein said switching means is comprised of:

first means having a first end forming a first terminus of said switching means, and a second end, for enabling said moving pin to travel around a first path subtending a first arc extending between said first and second ends with a center of said first arc being coaxial with said central axis; and second means forming a second terminus of said switching means, for enabling said moving pin to travel around a second path describing a continuous circuit connected to said first means at said second end and subtending a second arc next adjoining said first arc.

9. The door apparatus of claim 6, wherein said switching groove is comprised of:

an arcuate section having first and second terminals open to conduct said moving pin through an arc extending between said first and second terminals; and a continuous section having a fork with first and second branches extending from said second terminal, and open to conduct said moving pin from said first branch of said fork, along a plurality of lengths, and to said second branch of said fork.

10. The door apparatus of claim 9, wherein said plurality of lengths comprise:

a first of said lengths extending transversely from said fork along a first straight path substantially parallel to said second branch;

a second of said lengths extending from said first of said lengths; and a third of said lengths extending between said second of said lengths and said second branch along a second straight path substantially parallel to said first branch;

sides of said second and third of said lengths most proximal to said central axis forming means for limiting arcuate travel of said moving pin and for engaging said moving pin when said first and second hanging pins cause said bias means to exhibit a greatest force as said moving pin travels along said switching groove between said second and third of said lengths.

11. The door apparatus of claim 9, wherein said:

first branch of said fork extends along a first straight path continuing from said second terminal along an first axis traverse to and on one side of a tangent to said first arc at said second terminal, obliquely away from said central axis; and second branch of said fork extends along a second straight path continuing from said second terminal along a second axis traverse to said tangent and said first branch and on a second and opposite side of said tangent from said first side; and a first of said lengths extends traversely from said first branch along a third straight path substantially parallel to said second branch;

a second of said lengths extends from said first of said lengths; and a third of said lengths extends between said second of said lengths and said second branch along a fourth straight path substantially parallel to said first branch;

sides of said second and third of said lengths most proximal to said central axis forming means for limiting arcuate travel of said moving pin and for engaging said moving pin when said first and second hanging pins cause said bias means to exhibit a greatest force as said moving pin travels along said switching groove between said second and third of said lengths.

12. The door apparatus of claim 6, further comprised of a liquid phase fluid contained within said cavity, between said main body and first gear.

13. A door apparatus, comprising:

a main body providing a housing having a central axis, a switching groove, and means for attaching the main body to a panel;

said main body providing an interior cavity means for containing a viscous liquid;

a first gear having a first plurality of teeth disposed around a first periphery and a connecting aperture, and a slot;

means extending through said aperture, for attaching said first gear to said main body with said first gear disposed to rotate around said central axis relative to said main body with said first gear engaging said main body and enclosing said cavity means and with said slot being positioned within said cavity means on one side of said first gear facing said switching groove;

a second gear having a second plurality of teeth disposed around a second periphery, and connectable to a second panel with said second plurality of teeth meshing with said first plurality of teeth as the first and second panels are moved relative to one another;

a moving pin;

means disposed within said slot and between said main body and said first gear, for holding said moving pin with said moving pin positioned within said cavity means and said switching groove; and means disposed within said cavity means and connected to said first gear and said main body, for biasing said first gear toward one position relative to said main body.

14. The door apparatus of claim 13, further comprised of said second gear being positionable to rotate around a shaft of a hinge of the second panel.

15. The door apparatus of claim 13, wherein said switching groove is comprised of:
- an arcuate section having first and second terminals open to conduct said moving pin through an arc extending between said first and second terminals; and
- a continuous section having a fork with first and second branches extending from said second terminal, and being open to conduct said moving pin from said first branch of said fork, along a plurality of lengths, and to said second branch of said fork.

16. The door apparatus of claim 15, wherein said plurality of lengths comprise:
- a first of said lengths extending transversely from said fork along a first straight path substantially parallel to said second branch;
- a second of said lengths extending from said first of said lengths; and
- a third of said lengths extending between said second of said lengths and said second branch along a second straight path substantially parallel to said first branch;
- sides of said second and third of said lengths forming a notch for receiving and restraining passage of said moving pin against a force applied by said biasing means as said moving pin travels.

17. The door apparatus of claim 15, wherein said:
- first branch of said fork extends along a first straight path continuing from said second terminal along an first axis traverse to and on one side of a tangent of said first arc at said second terminal; and
- second branch of said fork extends along a second straight path continuing from said second terminal along a second axis transverse to said tangent and said first branch and on a second and opposite side of said tangent from said first side; and
- a first of said lengths extends traversely from said first branch along a third straight path substantially parallel to said second branch;
- a second of said lengths extends from said first of said lengths; and a third of said lengths extends between said second of said lengths and said second branch along a fourth straight path substantially parallel to said first branch;
- sides of said second and third of said lengths most proximal to said central axis forming means for limiting arcuate travel of said moving pin and for engaging said moving pin when said first and second hanging pins cause said bias means to exhibit a greatest force as said moving pin travels along said switching groove between said second and third of said lengths.

* * * * *